United States Patent
Meredith et al.

(10) Patent No.: US 8,224,349 B2
(45) Date of Patent: *Jul. 17, 2012

(54) TIMED FINGERPRINT LOCATING IN WIRELESS NETWORKS

(75) Inventors: Sheldon Meredith, Marietta, GA (US);
Mark Austin, Roswell, GA (US);
Jeremy Fix, Acworth, GA (US); Wenjie Zhao, Princeton, NJ (US); Sarat Puthenpura, Berkeley Heights, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/712,424

(22) Filed: Feb. 25, 2010

(65) Prior Publication Data

US 2011/0207470 A1  Aug. 25, 2011

(51) Int. Cl.
*H04B 7/00* (2006.01)

(52) U.S. Cl. .................................. 455/456.1; 370/328

(58) Field of Classification Search ............... 455/456.1; 370/328
See application file for complete search history.

(56) References Cited

U.S. PATENT DOCUMENTS

| | | | |
|---|---|---|---|
| 5,724,660 A | 3/1998 | Kauser et al. | |
| 5,732,354 A | 3/1998 | MacDonald | |
| 5,732,383 A | 3/1998 | Foladare et al. | |
| 5,982,324 A | 11/1999 | Watters et al. | |
| 6,148,219 A | 11/2000 | Engelbrecht et al. | |
| 6,256,577 B1 | 7/2001 | Graunke | |
| 6,317,686 B1 | 11/2001 | Ran | |
| 6,453,168 B1 | 9/2002 | McCrady et al. | |
| 6,560,532 B2 | 5/2003 | Cayford | |
| 6,594,576 B2 | 7/2003 | Fan et al. | |
| 6,690,292 B1 | 2/2004 | Meadows et al. | |
| 6,744,383 B1 | 6/2004 | Alfred et al. | |
| 6,744,740 B2 * | 6/2004 | Chen ........................... 370/255 |

(Continued)

FOREIGN PATENT DOCUMENTS

EP  0856746 A2  8/1998

(Continued)

OTHER PUBLICATIONS

International Search Report for PCT Application No. US2011/026122 dated Sep. 10, 2011, 11 pages.

(Continued)

*Primary Examiner* — Joseph Chang
(74) *Attorney, Agent, or Firm* — Turocy & Watson, LLP

(57) ABSTRACT

Systems and techniques for determining the location of user equipment (UE) in a wireless network are disclosed. These techniques leverage geometric calculations for an overlaid bin grid framework mapping the wireless network area to store differential values for each frame of the bin grid framework for each pair of relevant NodeBs. A timing offset can be determined, such that when a time value from a target UE is accessed, the location can be quickly determined with minimal real time computation. In an aspect, the target UE time value can be search for in the pre-computed differential value data set indexed by a relevant NodeB site pair to return a set of frames (forming a hyperbola between the site pair) that can be intersected with a second set of frames for a second NodeB site pair for the same UE. The intersecting frames can represent the location of the UE in the wireless network. Further, the data can be leveraged to correct timing in the network.

21 Claims, 10 Drawing Sheets

U.S. PATENT DOCUMENTS

| | | | |
|---|---|---|---|
| 6,801,782 | B2 | 10/2004 | McCrady et al. |
| 6,801,855 | B1 | 10/2004 | Walters et al. |
| 6,816,782 | B1 | 11/2004 | Walters et al. |
| 6,933,100 | B2 | 8/2005 | Igawa et al. |
| 7,098,805 | B2 | 8/2006 | Meadows et al. |
| 7,149,534 | B2 | 12/2006 | Bloebaum et al. |
| 7,277,049 | B2 | 10/2007 | Korneluk et al. |
| 7,289,039 | B2 | 10/2007 | Kato et al. |
| 7,366,492 | B1 * | 4/2008 | Ganesh ................. 455/404.2 |
| 7,375,649 | B2 | 5/2008 | Gueziec |
| 7,432,829 | B2 | 10/2008 | Poltorak |
| 7,508,321 | B2 | 3/2009 | Gueziec |
| 7,706,964 | B2 | 4/2010 | Horvitz et al. |
| 7,744,740 | B2 | 6/2010 | Diehl |
| 7,761,225 | B2 | 7/2010 | Vaughn |
| 7,831,380 | B2 | 11/2010 | Chapman et al. |
| 7,848,880 | B2 | 12/2010 | Cheung |
| 7,962,162 | B2 | 6/2011 | McNair |
| 7,994,981 | B1 | 8/2011 | Farrokhi et al. |
| 2001/0047242 | A1 | 11/2001 | Ohta |
| 2003/0222819 | A1 | 12/2003 | Karr et al. |
| 2004/0155814 | A1 | 8/2004 | Bascobert |
| 2007/0217375 | A1 | 9/2007 | Zampiello et al. |
| 2008/0071466 | A1 | 3/2008 | Downs et al. |
| 2008/0096566 | A1 | 4/2008 | Brunner et al. |
| 2008/0186234 | A1 | 8/2008 | Alles et al. |
| 2009/0079622 | A1 | 3/2009 | Seshadri et al. |
| 2009/0287922 | A1 | 11/2009 | Herwono et al. |
| 2010/0250542 | A1 | 9/2010 | Fujimaki |

FOREIGN PATENT DOCUMENTS

| | | |
|---|---|---|
| WO | 2006031035 A1 | 3/2006 |

OTHER PUBLICATIONS

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.

"Location Based Fraud Detection", Finsphere Corporation, 2008-2010.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/sumunary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last accessed Dec. 24, 2010, 7 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

Suykens J.A.K., Vandewalle J., "Least squares support vector machine classifiers", Neural Processing Letters, vol. 9, No. 3, Jun. 1999, pp. 293-300.

M. Ferris, and T. Munson (2002). "Interior-point methods for massive support vector machines". SIAM Journal on Optimization 13: 783-804. doi:10.1137/S1052623400374379.

David Meyer, Friedrich Leisch, and Kurt Hornik. "The support vector machine under test." Neurocomputing 55(1-2): 169-186, 2003.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18. 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up its Game?" PC World, Dec. 10, 2009, 1 page.

Fleishman. Using the Personal Hotspot on your AT & T iPhone. Published online Mar. 15, 2011. http://www.macworld.com/article/158556/2011/03/personal_hotspot_att..., 4 pages.

Fleischfresser. Never Stop at a Red-Light Again. Published online Aug. 30, 2011. http://www.smartplanet.com/blog/..., 2 pages.

Cellphone Networks and the Future of Traffic. Published online Mar. 2, 2011. http://m.wired.com/autopia/2011/03/cell-phone-networks-and-the-future-...15 pages.

Intelligent Transportation System. Published online http://en.wikipedia.org/wiki/Intelligent_transportation_system, 7 pages.

Koukoumidis Emmanouil, Peh Li-Shiuan, Martonosi Margaret, SignalGuru: Leveraging Mobile Phones for Collaborative Traffic Signal Schedule Advisory. 14 pages.

Bitcarrier Technology. Published online at http://www.bitcarrier.com/technology. 1 page.

Hao Peng, Ban Xuegang(Jeff). Estimating Vehicle Position in a Queue at Signalized Intersections Using Simple Travel Times from Mobile Sensors. 6 pages.

Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.

Office Action dated Dec. 28, 2011 for U.S. Appl. No. 12/836,471, 34 pages.

Office Action dated Feb. 23, 2012 for U.S. Appl. No. 12/967,747, 31 pages.

* cited by examiner

TIMED FINGERPRINT LOCATING IN WIRELESS NETWORKS

TECHNICAL FIELD

The subject disclosure relates to wireless communications and, more particularly, to location determinations of mobile equipment in a wireless network environment.

BACKGROUND

In mobile equipment networks, locating user equipments (UEs) can provide valuable additional benefits to users and opportunities for additional or improved services. Typical mobile equipment networks provide wireless access to various communications services for UEs, such as voice, video, data, messaging, content broadcast, VoIP, etc. Wireless networks types can include Universal Mobile Telecommunications System (UMTS), Long Term Evolution (LTE), High Speed Packet Access (HSPA), Code Division Multiple Access (CDMA), Time Division Multiple Access (TDMA), Frequency Division Multiple Access (FDMA), Multi-Carrier Code Division Multiple Access (MC-CDMA), Single-Carrier Code Division Multiple Access (SC-CDMA), Orthogonal frequency division multiple access (OFDMA), Single-carrier FDMA (SC-FDMA), etc.

Locating UEs in a wireless network can facilitate providing location-centric services or information in relation to the UE, such as E911 services, mapping services, or traffic information services, among many others. Additionally, UE location information can be employed to improve network performance, to troubleshoot networks, by law enforcement, to aggregate valuable demographic information, or nearly a limitless number of other uses. Such additional usage of UE location data can proactively include removal or obfuscation of identifying information at various levels to address privacy concerns.

Traditional methods of determining UE locations include measuring the timing delay of the signals transmitted between the wireless base station and the wireless handset and applying various location services or methods, including, but not limited to, cell global identity and timing advance (CGI+TA), CGI and round trip time (CGI+RTT), time of arrival (TOA), or other custom methods. Network timing delays include site timing delay in the wireless signal path among radio component(s) at the wireless base station and a sector antenna. Network timing delays further include delays that can arise from various mismatches (e.g., impedance mismatch) among electronic elements and components, stray capacitances and inductances, length of the antenna(s) cable(s) in base station(s); tower height of base station, signal path scattering, or "signal bounces," such as multipath or strong reflections, and the like. Propagation delay between a UE and a NodeB is conventionally assumed to be negligible with respect to timing delay. However, depending on the architecture of the serving base station and covered sector antenna(s) signal propagation delay can be substantive, particularly in distributed antenna systems and low-power wireless radio cells and cause significant error in UE location determinations for traditional methods.

It is becoming more common to try to determine propagation delay with improved accuracy so as to improve UE location calculations. Conventional UE location techniques include, but are not limited to, Cell ID (CID) wherein errors of multiple km are expected, Enhanced CID (ECID) which includes mobile timing advance and allows location of the mobile within an arc some distance from the base site and errors can still be multiple km, RF signal strength (RSSI) reported by the UE often having errors of >1 km due to RSSI variation, Round Trip Time (RTT) for multilateration from three or more base sites with errors often >1 km, Uplink Time Difference of Arrival (UTDOA) using specialized receivers on three or more base stations to measure the propagation time difference between the mobile and sites, or Assisted GPS (AGPS) using a GPS receiver in a UE to compute its own location to <10 m where satellite coverage is accessible (which can be <70% of the time.)

SUMMARY

The following presents a simplified summary of the disclosed subject matter in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One or more embodiments provide system(s) and method(s) for determining the location(s) of UE(s) in a wireless network. This can facilitate determinations of propagation delay values of wireless signals that can be leveraged to improve network performance, e.g., to allow for correction of wireless network system timing. Further, location determinations can facilitate location-centric services and information related to the UE (e.g., mapping, points of interest, etc.) and/or by other entities (e.g., E911, traffic analysis, population demographics, etc.)

Wireless signals can be radio frequency signals, microwave signals, or other electromagnetic waves employed for telecommunication. Compensation of signal path propagation is accomplished for sources of delay, such as, for example, mismatches (e.g., impedance mismatch) among electronic elements and components, stray capacitances and inductances, length of the antenna(s) cable(s) in base station(s); tower height of base station, signal propagation scattering, or "signal bounces," such as multipath or strong reflections, etc. Signal path compensation is effected, at least in part, through determination of a propagation delay. Such determination is based, at least in part, on statistical analysis of the location of UEs (or other reference locations) throughout a coverage sector or cell. These UE locations can be generated through time fingerprint locating (TFL) measurements of wireless signals. In an aspect, high-accuracy (e.g., 1 m–10 m) location estimates of select mobile devices, such as estimates obtained by way of assisted global positioning system (AGPS) or other global navigation satellite systems (GNSSs), e.g., Galileo or GLONNAS, can be leveraged in locating UEs.

Aspects, features, or advantages of the various embodiments of the subject disclosure can be exploited in wireless telecommunication devices, systems or networks. Non-limiting examples of such devices or networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rate for GSM Evolution (EDGE) Radio Access Network (RAN) or GERAN; UMTS Terrestrial Radio Access Network (UTRAN); or LTE Advanced. Additionally, aspects of the disclosed subject matter can include legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
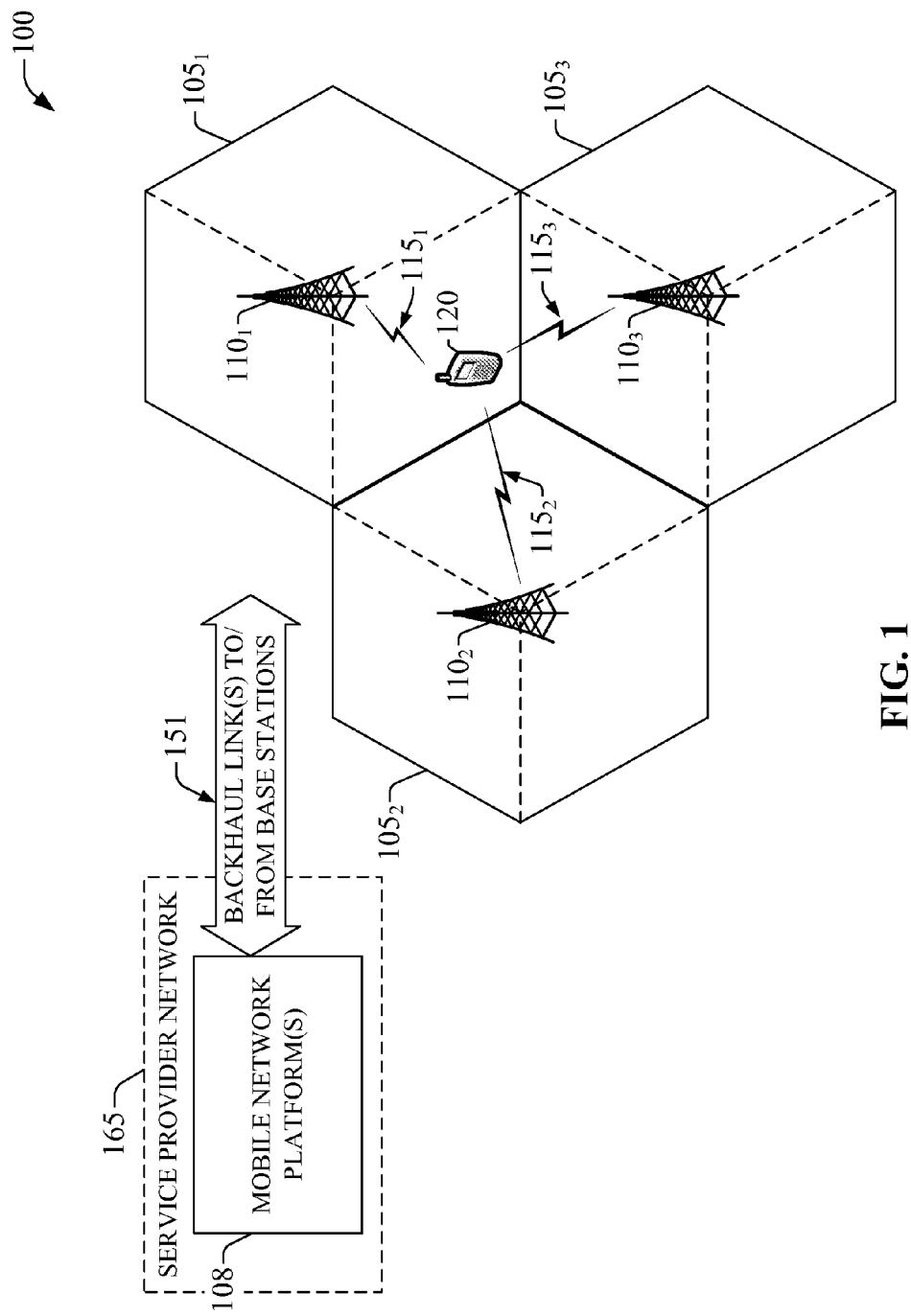
FIG. 1 illustrates a schematic exemplary wireless environment that can operate in accordance with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

The following abbreviations are relevant, at least in part, to the subject specification.
3G Third Generation
3GPP Third Generation Partnership Project
AGPS Assisted GPS AP Access Point
BCH Broadcast Channel
CGI Cell Global Identity
CN Core Network
CS Circuit-Switched
DAS Distributed Antenna System
DCH Dedicated Transport Channel
DSL Digital Subscriber Line
E911 Enhanced 911
FACH Forward Access Channel
FL Forward Link
GGSN Gateway GPRS Service Node
GPRS General Packet Radio Service
GSM Global System for Mobile Communication
GNSS Global Navigation Satellite System
GW Gateway
ISDN Integrated Services Digital Network
UE User Equipment
IMS IP Multimedia Subsystem
IP Internet Protocol
ISP Internet Service Provider
IPTV IP Television
NBSP NodeB Site Pair
PCH Paging Channel
PCS Personal Communications Service
PS Packet-Switched
PSTN Public Switched Telephone Network
RAN Radio Access Network
RAT Radio Access Technology
RBS Radio Base Station
RL Reverse Link
RL-TDOA RL Time Difference of Arrival
RL-TOA RL Time of Arrival
RNC Radio Network Controller
RRC Radio Resource Control
RTT Round Trip Time
SGSN Serving GPRS Support Node
TA Timing Advance
U-TDOA Uplink Time Difference of Arrival
U-TOA Uplink Time of Arrival
URA UTRAN Registration Area
UTRAN Universal Terrestrial Radio Access Network FIG. 1 is a schematic example wireless environment 100 that can operate in accordance with aspects described herein. In particular, example wireless environment 100 illustrates a set of wireless network macro cells. Three coverage macro cells $105_1$-$105_3$ comprise the illustrative wireless environment; however, it should be appreciated that wireless cellular network deployments can encompass any number of macro cells, for example, $10^4$-$10^5$ coverage macro cells. Coverage macro cells $105_\lambda$ ($\lambda$=1,2,3) are illustrated as hexagons; however, coverage cells can adopt other geometries generally dictated by a deployment configuration or floor plan, geographic areas to be covered, and so on. Each macro cell $105_\lambda$ is sectorized in a $2\pi/3$ configuration in which each macro cells includes three sectors, demarcated with dashed lines in FIG. 1. It should be appreciated that other sectorizations are possible, and aspects or features of the disclosed subject matter can be exploited regardless of type of sectorization. Macro cells $105_1$, $105_2$, and $105_3$ are served respectively through NodeB $110_1$, $110_2$ and $110_3$. Any two NodeBs can be considered a NodeB site pair (NBSP) It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 108, and set of base stations (e.g., Node B $110_n$, with n=1, 2, . . . ) that serve a set of macro cells; electronic circuitry or components associated with the base stations in the set of base stations; a set of respective wireless links (e.g., links $115_k$ where k=1, 2, . . . ) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links $115_k$ embody a Uu interface (UMTS Air Interface).

Mobile network platform(s) 108 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, wireless network platform(s) 108 can control and manage base stations $110_\lambda$, and radio component(s) associated thereof, in disparate macro cells $105_\lambda$ by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), . . . ) In cellular wireless technologies (e.g., 3rd Generation Partnership Project (3GPP) Universal Mobile Telecommunication System (UMTS), Global System for Mobile Communication (GSM)), wireless network platform 108 is embodied in a core network and a set of radio network controllers.

In addition, wireless backhaul link(s) 151 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 151 embodies IuB interface.

It should be appreciated that while exemplary wireless environment 100 is illustrated for macro cells and macro base stations, aspects, features and advantages of the disclosed subject matter can be implemented in microcells, picocells, femto cells, or the like, wherein base stations are embodied in home-based access points.

Timing of wireless signals must take into consideration the time from wave signal generation or output at radio equipment a transmitter (e.g., a UE or NodeB) to detection at a receiver (e.g., a UE or NodeB). Such timing includes site timing through link(s) to antenna(s) and propagation time over the air interface or wireless channel Timing delay typically is caused by various source, e.g., mismatches among electronic elements and components (e.g., impedance mismatch), stray capacitances and inductances, length of the antenna(s) cable(s) in base station(s); tower height of base station, whereas timing delay spread generally originates from any signal path scattering, or "signal bounces," such as multipath, strong reflections, etc.; and the like. In an aspect of the disclosed subject matter, timing and delay errors can be compensated for where the errors in delay and timing can be determined. Wherein better location measurements beget better timing measurements, aspects of the disclosed subject matter can, at least in part, contribute to improved network performance. Similarly, better timing measurements can be employed for better location determination. Further, it is noted that compensation of timing delay can depend on sector coverage, e.g., a first sector can be densely populated while a neighboring sector can include substantial areas of lower population density.

A UE observed time difference, 'C', includes both a cell site timing portion, 'A', and a RF propagation portion, 'B', such that A+B=C. Further, where cell site location and UE location are known, the RF propagation time, B, can be deduced, e.g., B=(distance between UE and cell site/speed of light). Using the deduced RF propagation time, B, and Observed UE time difference, C, the cell site timing, A, can be calculated, as A=C−B. Site timing, A, is relatively stable over periods of hours to days for most modern network equipment. Once A is determined, C can be measured for additional UEs and the RF propagation time (i.e., B) for theses additional UEs can be determined by B=C−A. RF propagation time, B, can then be converted into a distance (e.g., B*speed of light=distance) and, using multilateration techniques, UEs positions can be identified.

Determining the values of B by geometry can be facilitated by having a knowledge of the location the NodeB and UE. NodeB locations are typically known with high levels of precision, as these are normally permanent installations. Further, the location of a particular UE can be determined using internal GPS systems (e.g., AGPS, usually to within 5-10 meter accuracy). Thus an AGPS enabled UE can facilitate the determination of A, as disclosed herein, such that the location of non-location aware UEs in a macro cell can be calculated, for example, by multilateration. In experiments, these measurements can produce location accuracies for non-location aware UEs with median errors of <70 m in suburban areas. Multilateration incorporates compounding errors. Further, multilateration is also computationally significant (e.g., involves hyperbolic functions between NBSPs at (N−1)!, where N is the number of cell sites, for example, 5 cell sites would involve 24 simultaneous hyperbolic functions.) Timed fingerprint locating (TFL), as disclosed herein, can reduce computational complexity and provide pre-computed values in lookup tables to facilitate improved location techniques.

Figure 2:
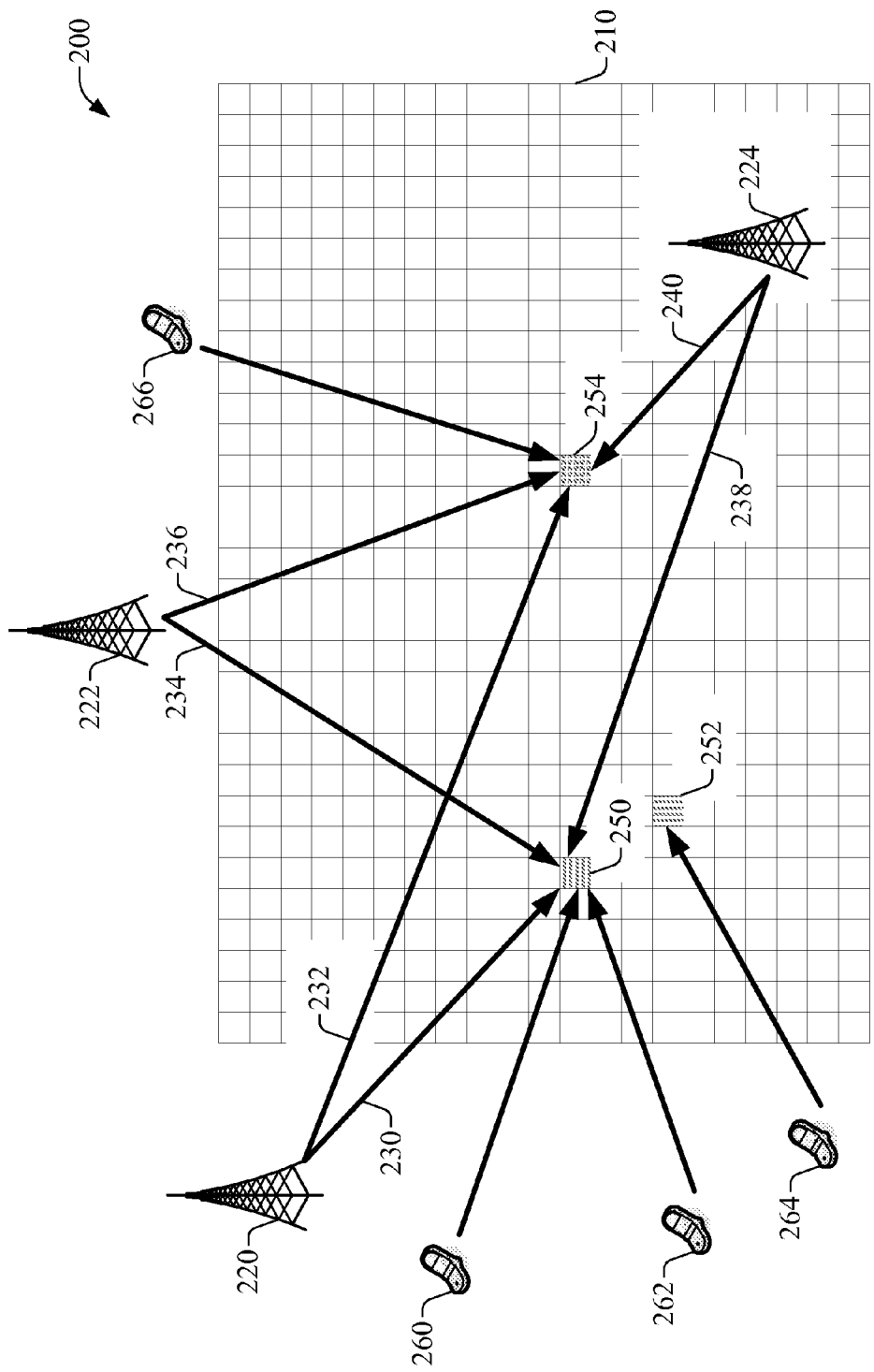
FIG. 2 is a diagram of a subset of wireless devices (UEs) in a time fingerprint location wireless environment, in accordance with aspects of the disclosed subject matter.

FIG. 2 is a diagram of a subset of wireless devices (e.g., UEs) in a timed fingerprint location (TFL) wireless environment 200, in accordance with aspects of the disclosed subject matter. TFL wireless environment 200 includes a bin grid 210 that is a relative coordinate framework which defines a matrix of evenly spaced points referred to interchangeably as bins or frames. The frames can be correlated to a geographic data set, e.g., the bin grid 210 can provide identifiable regions of a predetermined area related to a mapping of a cell site, NodeB, county, county, etc. It can generally be stated that any UE is in one bin grid 210 frame at a given time.

Bin grid 210 frames are of arbitrary size and number. As such, all levels of frame granularity with regard to TFL techniques are considered within the scope of the present disclosure. However, for simplicity, bin grid 210 (and also 310) frame size will be considered to be 100 meters by 100 meters for the purposes of discussion herein, as this closely matches current UMTS chip size (e.g., UMTS chip rate is 3.84 MBit/sec, therefore one chip is roughly 260.42 nsec and 78 meters). Additionally, a bin grid can comprise other bin grids or portions thereof. Moreover, bin grids may overlap wholly or partially and at any orientation. For simplicity, only single bin grids are discussed herein, but all permutations are considered within the scope of the present disclosure. It is further noted that a bin grid can be physically two dimensional (2D) or three dimensional (3D), wherein a 2D grid can, for example, include x,y coordinates (e.g., latitude, longitude) and a 3D grid can add, for example, a z dimension (e.g., height). For simplicity, only 2D bin grids are discussed herein, although both 2D and 3D bin grids are considered within the scope of this disclosure. Moreover, abstract dimensions can be considered, such as, for example, time, network type, subscriber level, etc. All such additional abstract dimensions are within the scope of the subject disclosure. For simplicity, these additional abstract dimensions will not be further discussed.

TFL wireless environment 200 can further include one or more NodeB cell base sites 220, 222, 224. These NodeB are typically fixed locations with well-characterized location coordinates such that the distance between a NodeB and any given frame of bin grid 210 can be easily computed. In FIG. 2, distances 230 and 232 correlate to measurements between NodeB 220 and frames 250 and 254 respectively. Similarly, distances 234 and 236 correlate to measurements between NodeB 222 and frames 250 and 254 respectively. Likewise, distances 238 and 240 correlate to measurements between NodeB 224 and frames 250 and 254 respectively. Given that the distances from any NodeB to any frame in bin grid 210 can be accurately calculated, the differential distance of any frame to any two NodeB can also be accurately determined. Similarly, the distance between any two frames of bin grid 210 is readily calculated.

Additionally, TFL wireless environment 200 can include one or more UEs (e.g., mobile phones 260, 262, 264 and 266). These UEs can include location aware UEs (e.g., AGPS enabled UE) and non-location aware UEs. Wireless interactions with UEs can be correlated to nodes in bin grid 210. For example, an AGPS enabled UE can determine a latitude and longitude that can be correlated with a bin grid 210 node encompassing that same latitude and longitude.

Where UE 260 is a location aware UE (e.g., UE 260 is AGPS enabled), UE 260 can make location information available to the TFL wireless environment 200, for example, through one or more NodeBs (e.g., 220, 222, 224). UE 260, for instance, can be located at a latitude and longitude within frame 250 of bin grid 210 and, for example, can transmit this latitude and longitude location information, which can be received by, for example, NodeB 220. This latitude and longitude location information can be directly correlated to frame 250 and also with the RF propagation delay, B, to frame 250 from some NodeB in TFL wireless environment 200. For example, where UE 260 is located in frame 250, propagation delay 'B' is the distance 230 between from NodeB 220 and UE 260 (located in frame 250) divided by the speed of light. Thus, the propagation delay 'B' can be directly determined because the location of both the NodeB and the UE are known, as disclosed herein. Further, NodeB 220 can communicate this location information, propagation delay information, or derivatives thereof, to other equipment associated with the wireless network.

Given that the propagation delay, B, can be determined for location aware UEs within TFL wireless environment 200, cell site delay, 'A', can be determined where the observed UE time difference, C, is also available. Continuing the present example, UE 260 can make time data (e.g., an observed UE time difference, 'C') accessible to the TFL wireless environment 200. Cell site delay ('A') can be calculated by subtracting the propagation delay ('B') from the observed UE time difference ('C'), (e.g., A=C−B). As discussed herein, A is generally stable over periods of hours to days. Assuming A is relatively stable, B can be determined for some C value (e.g., B=C−A). Most or all UEs (e.g., both location enabled and non-location enabled UEs) can make time data (e.g., an observed UE time difference, 'C') available to the TFL wireless environment 200, for example by transmitting it wirelessly, such that the propagation delay for most or all UEs can be determined with a simple calculation, given the determined A value. Further, given that the propagation delay, B, is essentially proportional to distance (e.g., B*speed of light=distance), the propagation delay can be employed to map out a region of probable locations for a UE at a set distance from the related NodeB (e.g., the NodeB from which the propagation delay was measured). This provides a centroid region in which the UE would likely be located.

It is well understood that errors can be associated with the various measurements involved in the disclosed calculations, for example, AGPS measurements are only accurate to about 5-10 meters, an AGPS measurement can be taken from various positions with a single 100 m×100 m bin grid frame, signals can be bounced, etc.) These errors can be addressed by well-known statistical methods for sufficiently large sets of location data. In an aspect of the disclosed subject matter, a frame of bin grid 210 can be selected as a reference frame and measurements within that frame can be statistically manipulated to improve the value of the data gathered. For example, where UE 260 and UE 262 are both location aware UEs located within from 250, the AGPS and time data from both UEs (260 and 262) can be statistically combined and manipulated to increase the relevance of the collected data and the resulting calculated values. Moreover, measurements taken from other frames can be translated to the reference frame to facilitate an increased population of location data to improve statistical data correction processes. This translation can be accomplished because knowledge of the spatial relationship between the measured frame and reference frame is known. For example, UE 264 can transmit AGPS location and time data from frame 252. This information can be accessed by a NodeB of TFL wireless environment 200. The data can be manipulated to translate the measured data from frame 252 into the expected values for UE 264 in frame 250. This can allow the AGPS location and time data, collected in various frames of bin grid 210 from location aware UEs, to be correlated to a relevant reference frame. This information can then be statistically adapted to provide improved data for use in calculating locations for non-location aware UEs. The equations for translation among frames will be further disclosed herein.

Differential measurements can be computed for one or more frames of bin grid 210 for any plurality (e.g., pair) of NodeBs within TFL wireless environment 200. For ease of understanding, bin grid 200 can comprise a large plurality of frames that are each uniquely identified allowing a single frame to be referenced by a "frame number". Alternative frame identification schemes are just as easily applied to identification of individual frames, e.g., row/column numbering, region/subregion/sector, etc., and all such schemes are considered within the scope of the present disclosure, however, such alternatives will not herein be further discussed. Similarly, each NodeB in a wireless system can be identified uniquely by a plurality of conventions, all of which are within the scope of the present disclosure, however only a "lettered" index is herein discussed, e.g., site j, site i, site k, etc. Where each NodeB is uniquely identifiable, each pair of sites is also uniquely identifiable, e.g., pair ij, pair ik, pair jk, pair ji, pair ki, pair kj, etc. Further, NBSPs and frames can be identified parenthetically as "(NBSP, frame)", wherein a question mark, "?", can be used to indicate an arbitrary value, e.g., (ij,250) is the 250 frame in relation to NBSP "ij", while (ij,?) is some undefined frame related to NBSP "ij", (?,250) refers to frame 250 in relation to an undefined NBSP, and similarly (?,?) refers to an arbitrary NBSP and arbitrary frame.

For each pair of NodeBs, each frame of a subset of relevant frames associated with the NBSP can have a value assigned that corresponds to that frame's differential value. A subset can comprise some frames, all frames, or no frames (e.g., an empty set). A differential value is a geometrically determined value related to the "distance" of a frame from a NBSP, measured in chip (e.g., "distance" can be a temporal or physical distance.) For known geometries, differential values can be pre-computed for frames.

The NBSPs of TFL wireless environment 200 can each have a reference frame (?,R), for example, (ij,R), (jk,R), (ik,R), etc. An observed time difference, OV(?,?), can be related to the "C" value reported by a location aware UE of system 200. In an aspect, an OV(?,R) value can be directly obtained by data from location aware UEs at a reference frame, R (e.g., UE 260 or UE 262 at reference frame 250 of TFL wireless environment 200.) In another aspect, where an OV(?,X) value from a location aware UE is reported from an instant frame, X, other than the reference frame, R, the value can be translated to a reference frame value based, at least in part, on known differential propagation delays according to:

$$OV(ji,R)=OV(ji,X)+DV(ij,R)-DV(ij,X),\qquad \text{Eq. (1)}$$

where

X identifies an instant frame, R identifies a reference frame, ij identifies a NBSP, ji identifies a NBSP, DV(ij,R) is a differential value for the reference frame of the NBSP ij that can be determined from the ij NBSP and reference frame geometry, DV(ij,X) is a differential value for frame X for NBSP ij that can be determined from the ij NBSP and frame X geometry, and OV(ji,X) is an observed value for an frame X of the ji NBSP, such that OV(ji,R) can be calculated. Moreover, OV(?,?) values can be weighted, for example, if a reporting UE is known to be moving at a high rate of speed, the OV(?,?) can be of less relevance and therefore can be given a lower weight. These weighted values can be statistically manipulated to provide a more relevant value for OV(?,R), for example, by reducing measurement error effects.

Whereas DV(ij,R) is the geometrically determined differential value for the reference frame of the ij NBSP, and having previously determined the observed time difference value for the reference frame of the ji NBSP as OV(ji,R), Eq. 1 can be manipulated to determine the expected observed time difference values for any instant frame, X, by simply determining the differential value for any instant frame, X, of the ji NBSP, DV(ji,X), and computing:

$$OV(ji,X)=OV(ji,R)+DV(ij,X)-DV(ij,R).\qquad \text{Eq. (2)}$$

This equation can be similarly employed for other known NBSPs as well. In an aspect, this allows an indexed mapping of expected OV(?,?) value(s) for frame(s) of NBSP(s) given a known geometry for the NBSPs and bin grid, and an OV(?,R) reference cell value (e.g., ascertained from location and time data from one or more location enabled UEs associated with a NBSP.)

Figure 3:
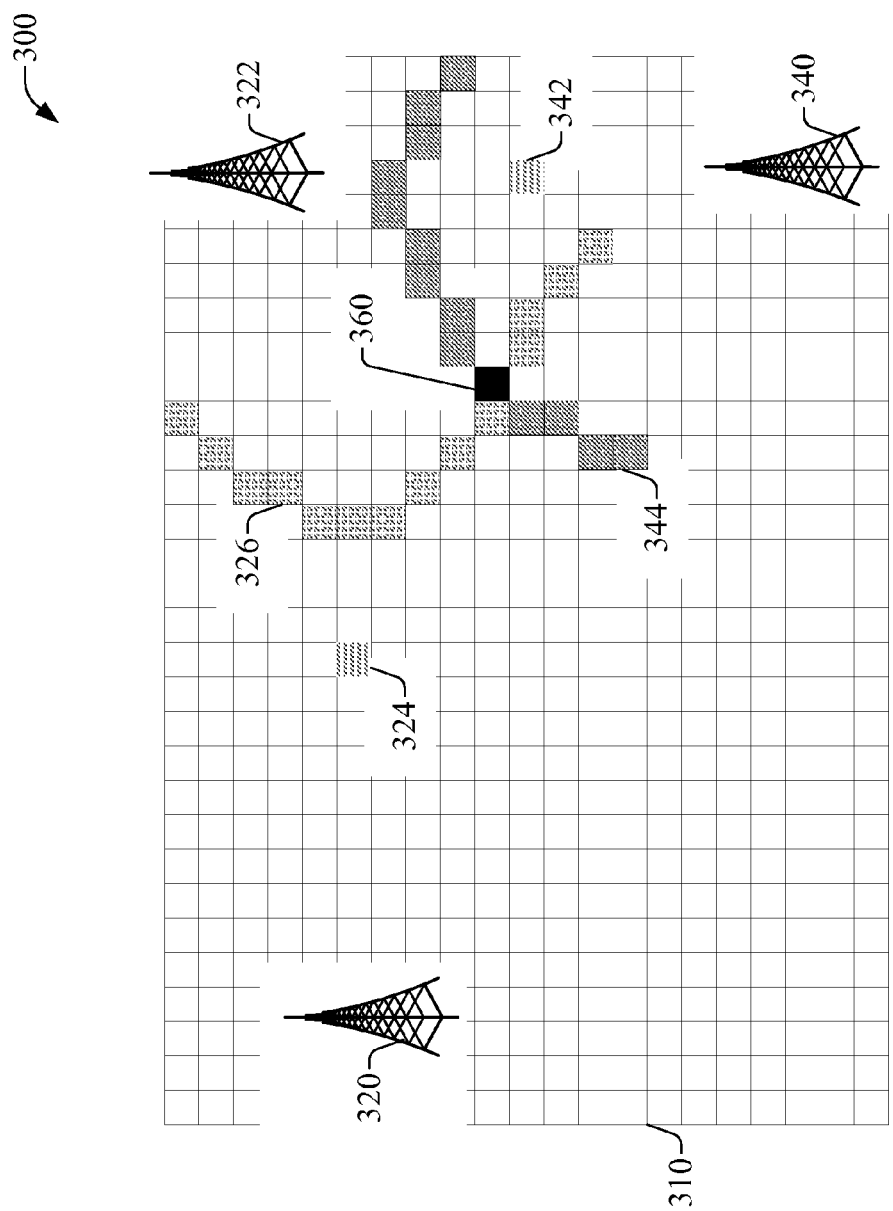
FIG. 3 is a diagram illustrating differential propagation delay sets for NBSPs in a time fingerprint location wireless environment in accordance with aspects described herein.

FIG. 3 illustrates differential propagation delay sets for NBSPs in a time fingerprint location wireless environment 300 in accordance with aspects of the subject disclosure. TFL wireless environment 300 can be referenced to a bin grid 310 and comprise one or more NodeBs (e.g., 320, 322, 340). As disclosed herein, the differential values, DV(?,X), can be geometrically determined, and mapped to each frame for every known NBSP. In an aspect, this DV(?,?) mapping can be in the form of a table or set of tables to facilitate rapid access to the data. Further, in a NBSP, for example ij, where an OV(ji,X) value is ascertained and OV(ji,R) is known, a corresponding DV(ij,X) value can be generated by:

$$DV(ij,X)=OV(ji,X)-OV(ji,R)+DV(ij,R),\qquad\text{Eq. (3)}$$

which is obtained by simple manipulation of Eq. 2. This calculated value of DV(ij,X) can function as a lookup value into the tabulated DV(?,X) data set(s), e.g., "return frames for NBSP ij having a DV(ij,X) value equivalent to the computed value from Eq. 3." The returned values generally will form a hyperbola for the NBSP when overlaid on a geographic map of the sites and bin grid framework. For the exemplary ij NBSP, the returned set can be referred to as the "ij primary set" and can be represented by the set of shaded frames 326 between sites 320 and 322, with corresponding ij NBSP reference frame 324.

In an aspect, UEs can be in an environment with a plurality of available NBSPs, for example, a UE located in frame 360 can be exposed to NBSPs 320/322, 320/340, and 322/340. NBSPs can return a related primary set. Prioritization of NBSPs can be beneficial by returning a primary set for the most relevant NBSP. In accordance with an aspect of the disclosed subject matter, a NBSP can be prioritized based, at least in part, on received signal code power (RSCP) which denotes the power measured by a receiver on a particular physical communication channel of the wireless network 300. For example, the FIG. 3 the NodeB RSCP values can be highest for 322, moderate for 340, and lowest for 320. Continuing this non-limiting example, the ordering of the NodeBs by RSCP can result in looking up primary sets from pair 322/340 first, then 322/320 second, and 340/320 last. It will be appreciated by one of skill in the art that other factors and criteria can be employed in determining what NBSPs are employed for primary pair lookups, for example, confidence scores for data sets, computational load aspects, number of requests in queue, cached primary sets, etc. It will further be appreciated that these numerous other factors and criteria are all within the scope of the present disclosure. As an additional non-limiting example, where NodeB 320 has recently come online and has a relatively newer data set as compared to 322 and 340, there may be a lower confidence in using those values and priority can be given to other NBSPs for lookup.

In an aspect, determining a DV(?,X) can be related to calculating a location for a UE time data ("C") accessed for a non-location enabled UE without the mathematical complexity of hyperbola multilateration. As disclosed herein, where "A" is relatively stable over hours or days, and "C" is accessed for a UE, the "B" value can be calculated and is related to the DV (in units of chip) from any pair of NodeBs. When UE time data is accessed, a DV(?,X) look-up can be initiated. Relevant NBSPs can be prioritized as part of the look-up, for example, by RSCP, etc. Further, the relevant pairs can be employed as an index to lookup a first primary set. As an example, in FIG. 3, time data for a UE (not illustrated) can be accessed in relation to a locating event in TFL wireless environment 300. In this example, it can be determined that NBSP 322/340, with reference frame 342, be used for primary set lookup with the computed DV(?,X) value as the index. This can for example return the shaded frames 344 forming a hyperbola between NodeB 322 and NodeB 340 where DV(?,X)=DV(322/340,X). This indicates that the UE is most likely located at one of the shaded frames of set 344. A second lookup can then be performed for an additional relevant NBSP, for example, NBSP 320/322, with reference frame 324, using the same value DV(?,X), as an index into the data set. Continuing the example, the returned set for the look up with DV(320/322,X)=DV(?,X) can return the set of shaded frames 326. Thus, the UE is also most likely located in the shaded frames designated by set 326. Therefore, where the UE is most likely in both set 344 and set 326, it is clear that the most probable location for the UE is at the intersection of the two sets, at frame 360.

It will be appreciated that additional lookups can be undertaken in an attempt to isolate the most likely frame by intersections of returned sets and that this aspect is within the scope of the current disclosure. In a further aspect, where no exact match is found, frames within a predetermined distance of the closest match can be retained as eligible, for example, frames within 5 chips of the closest match. In another aspect, more or less granular data sets can be employed to give more refined location results, for example, a more coarse granularity can be employed so that a match can be obtained even where the location footprint area is larger. As a second example, a finer granularity can be employed to better determine the location of a UE (e.g., a smaller footprint area) where such a data set is available and an exact match frame results. In some instances no single frame can be resolved (e.g., insufficient data, too few NodeBs, etc.)

Figure 4:
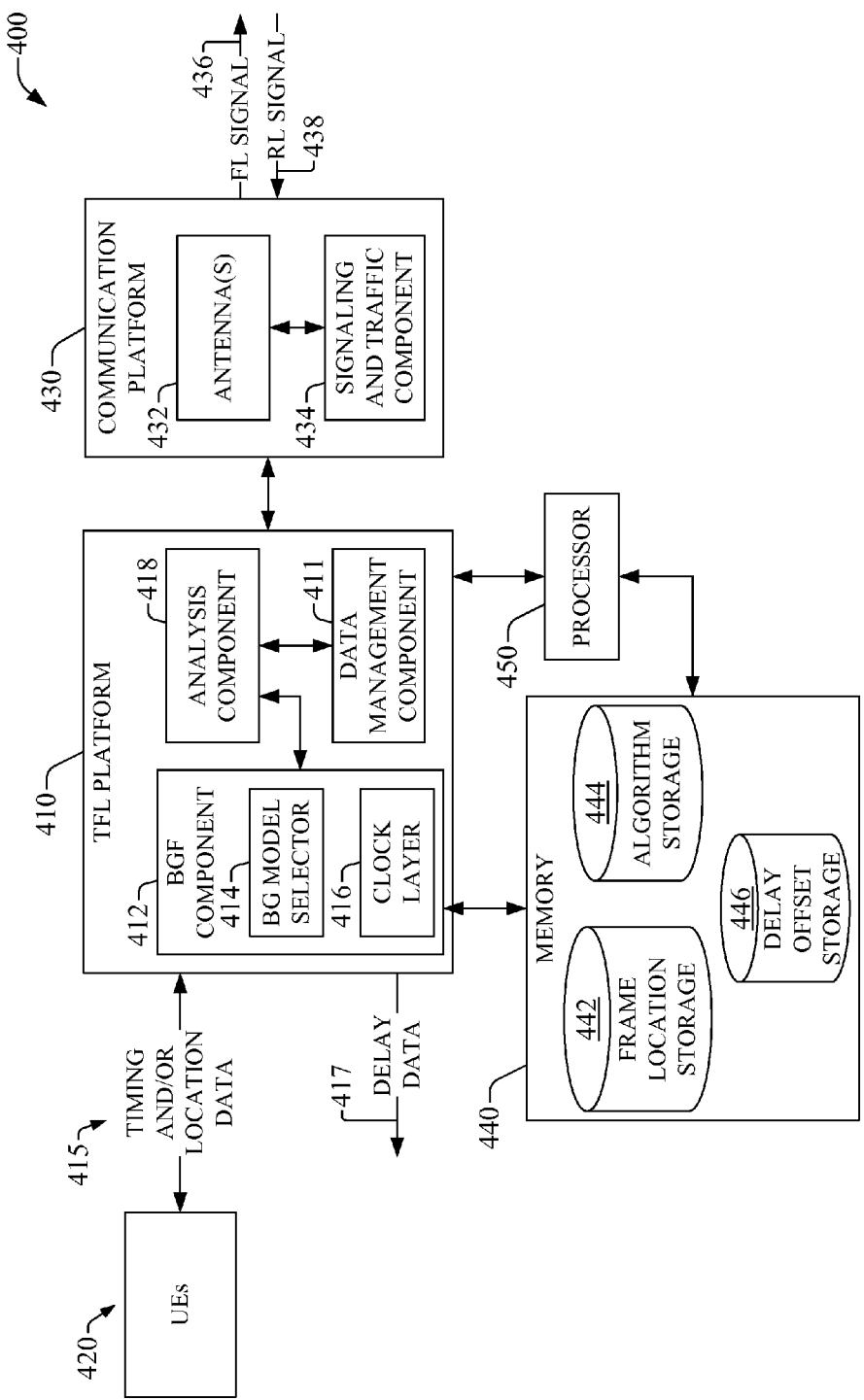
FIG. 4 is a block diagram of an exemplary system that facilitates calibration of wireless signal propagation delay in accordance with aspects described herein.

FIG. 4 illustrates a block diagram of an exemplary system 400 that facilitates time fingerprint location in accordance with aspects described herein. In an aspect, system 400 can be a part of a mobile network, and can reside at least in part within at least one of a network management component (e.g., radio network controller, core network, or network gateway) or a base station or access point. Example system 400 includes a time fingerprint location (TFL) platform 410 that facilitates location of UEs based at least in part on receiving an observed timing offset related to a frame.

Calibration platform 410 includes a bin grid framing (BGF) component 412 that can estimate the location of a mobile device or a stationary device that can communicate wirelessly. To at least that end, BGF component 412 can include a bin grid (BG) model selector 414 that selects an appropriate bin grid based at least in part on the geometry of the NBSPs interacting with the UE (not shown), e.g., selecting a particular subset of a bin grid to include frames related to NBSPs relevant to locating one or more UEs transmitting time data, select from bin grids of different granularity, selecting bin grid models related to updating frame data, etc. The model can be utilized in conjunction with observed time difference values ('C'), propagation timing values ('B'), and site timing values ('A') among forward link (FL) and reverse link (RL) wireless signals, e.g., signaling or traffic, delivered and received, respectively, by a base station or access point.

In an aspect, in example system 400, TFL platform 410 can request information (e.g., timing data, location data from a location enabled UE, etc.) from UEs through a FL wireless signal 436 that is conveyed by a signaling and traffic component 434 in a communication platform 430, which can be a part of a serving access point or NodeB. System 400 can access the requested information for UEs on a RL wireless signal 438, in the RL counterpart transport channel. It should be appreciated that communication platform 430 includes antenna(s) 432.

As described above, BGF component 412 can estimate location of a mobile device by at least in part searching computed location data sets for NBSPs and timing data that correlates to the computed values. The clock layer 416 can facilitate determining the propagation delay ('B'), for example from accessing an observed time difference ('C'). It is noted that such returned timing data is typically part of basic, conventional UE RAN operation, and no additional equipment is necessary to generate such data in most cases. Where such equipment is needed, it can be included and should be considered within the scope of the presently disclosed subject matter. Returned timing data in conjunction with bin grid frameworks provide a location estimate. Calibration platform 410 also includes analysis component 418 that can implement various algorithms, stored in algorithm storage 444, to characterize or evaluate various features of the returned location data, location estimates, etc., generated by BGF component 412. In an aspect, algorithms employed by analysis component 418 include statistical analysis methodologies; other analysis methodologies such as spectral analysis and time-series analysis also can be utilized. Location data can be cached in frame location storage 432. Frame location storage can be communicatively coupled to other data storage locations (not illustrated), either locally or remotely, to facilitate sharing and updating of the frame location information.

In an aspect, system 400 can facilitate compensation of wireless signal (e.g., RF, microwave, infrared . . . ) timing variations, or correction of wireless signal propagation information by way of TFL platform 410. TFL platform 410 can access location and time data from location aware UEs (e.g., as part of UEs 420) and time data from non-location aware UEs (e.g., as part of UEs 420). This timing and/or location data can be made available to data management component 411. Accessed location and/or timing data 415 can be retained in frame location storage 442 as raw data, processed data, data converted into frame data, etc. It should be appreciated that based upon specific aspects of the UEs 220, TFL platform 410 can access location and/or timing data 415 over an air-interface by way of communication platform 430, or through a network management component such as a network server, a radio network controller, or a network gateway. UEs 420 can provide location and/or timing data based, at least in part, on GNSS, such as assisted GPS, and network planning information. In an aspect, the UEs 420 comprise a set of mobile devices that, at least in part, support GNSS data reception and manipulation thereof. For example, these UEs can communicate with a GNSS system (e.g., GPS, Galileo, GLONASS . . . ) through a deep-space link. These UEs can receive timing signaling that allows determination, at least in part, of accurate position of each UE that receives sufficient information (e.g., timing information from three or more satellites) for triangulation. Alternatively, UEs can receive assisted timing information from mobile network platform(s), through base stations serving a relevant sector, mobile network platform(s) received timing information from GNSS through deep-space links, etc. Such timing information or location information can be received at various time instants and aggregated at TFL platform 410 through analysis component 418. Aggregation collects location and timing data received at various instants in time in order to augment the statistical significance of data and analysis thereof, which can improve accuracy of extracted location determinations and related propagation delay data.

Figure 5:
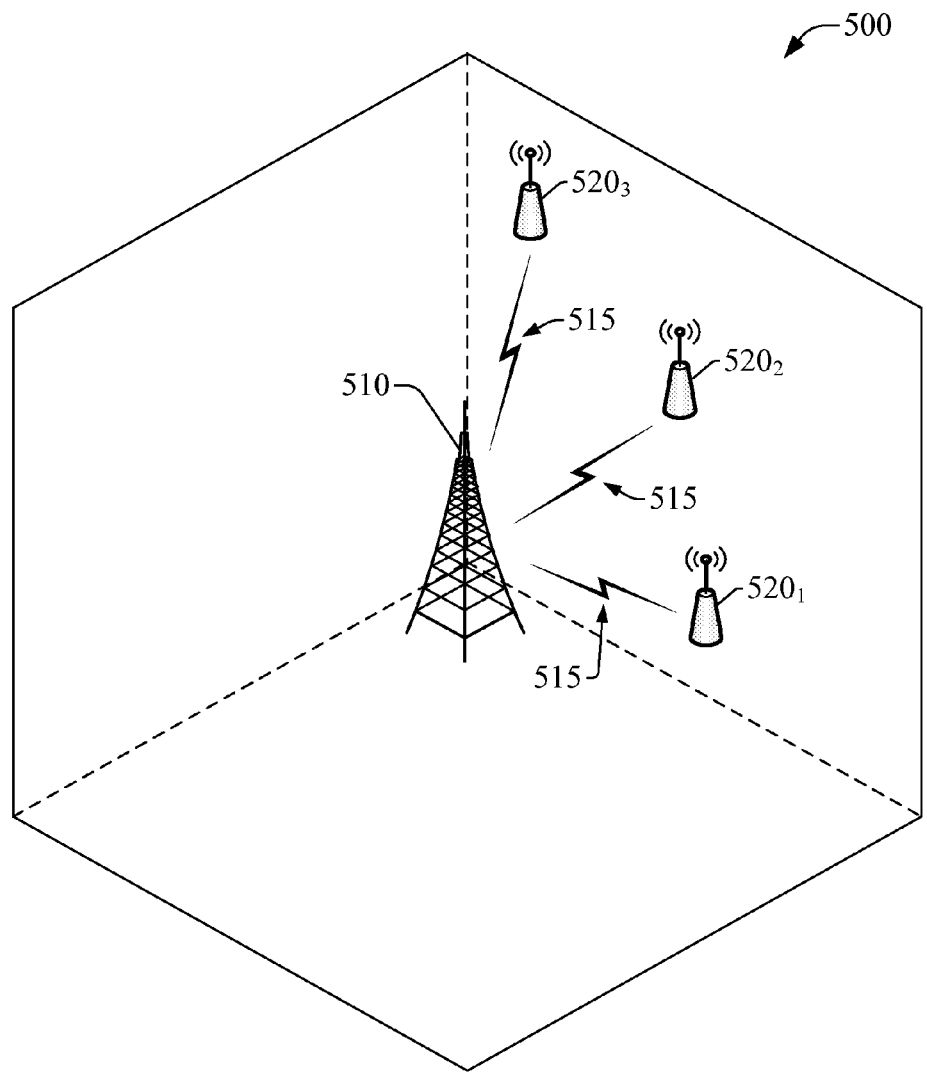
FIG. 5 is a diagram depicting additional or alternative timing and/or location data generation components facilitate calibration of reference frames in accordance with aspects described herein.

FIG. 5 depicts additional or alternative timing and/or location data 415 generation components $520_1$-$520_3$ that are not UEs 420 (e.g., calibration beacons, femto or pico cell equipment, etc.) to facilitate calibration of reference frames in a bin grid framework (e.g., 210, 310, etc.). Known locations for a set of probes, or wireless beacons, deployed within a coverage cell or sector, as illustrated, can be employed to determine A and B in a manner similar to a location aware UE. For example, macro coverage cell 500 is divided in three sectors (demarcated by dashed lines) served by base station 510, wherein a sector includes a set of three probes $520_1$-$520_3$ located at specific positions that are known, or available, to the one or more network components (e.g., mobile network platform(s) 108). Probes $520_1$-$520_3$ also communicate with base station 510 through wireless links 515. Communicated time data and a known position of the probes $520_1$-$520_3$ allows calculation of the A and B values as disclosed herein. Wireless probes, or beacons, can be stationary or pseudo-stationary. In an example, wireless probes can be Wi-Fi outdoor access points that are part of a public metropolitan network. In another example, wireless probes can be part of wireless-enabled utility equipment (e.g., electric meter(s)) deployed within a utility network, e.g., electric grid. It should be appreciated that wireless beacons embodied in utility meters can be better suited for smaller, urban coverage sectors, since transmission power of such probes can be low compared to power form Wi-Fi access points.

Various aspects of the disclosed subject matter can be automated through artificial intelligence (AI) methods to infer (e.g., reason and draw a conclusion based upon a set of metrics, arguments, or known outcomes in controlled scenarios) suitable models for propagation of wireless signal, e.g., RF signal, microwave signal, etc.; optimal or near-optimal positions for probes that enable generation of accurate location estimates; or the like. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

In view of the example system(s) described above, example method(s) that can be implemented in accordance with the disclosed subject matter can be better appreciated with reference to flowcharts in FIG. 6-FIG. 9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

Figure 6:
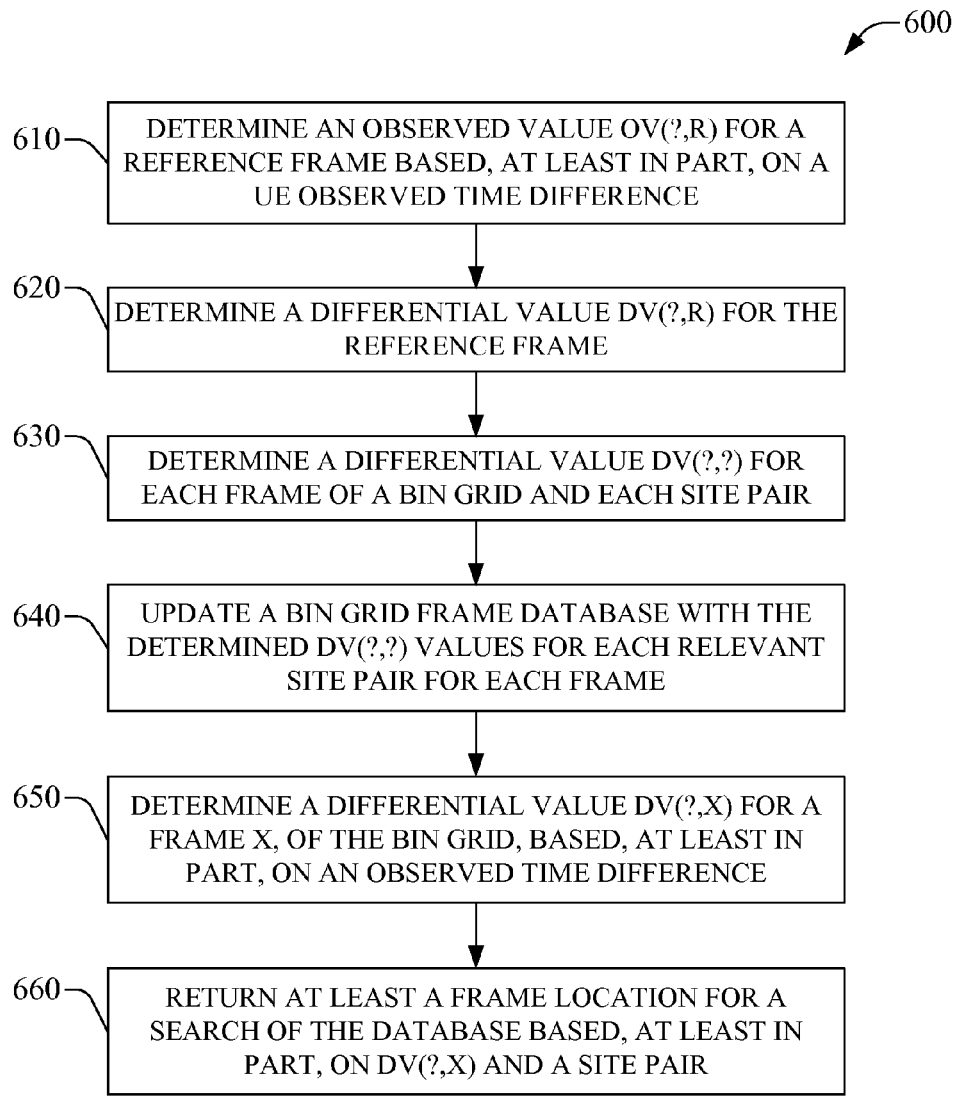
FIG. 6 presents a flowchart of an exemplary method 600 for determining a location for a UE.

FIG. 6 presents a flowchart of an example method 600 for determining a location for a UE. The location determination can facilitate correcting RF propagation delay information in an operational wireless system according to aspects described herein. Further, location information can be leveraged to provide location-centric information and services to users associated with UEs, for example, maps, events, sales, or social networking services, etc. Location-centric information and services can also be employed to provide additional services and products by way of aggregation of location information, for example, traffic data, usage data, or demographic data, among others. Still further, certain location dependant services can leverage location determinations of UEs, for example, E911. The subject example method 600, while illustrated for RF signal, also can be employed with regard to electromagnetic radiation (EM) with frequencies other than radio frequency, for instance, microwave EM radiation, infrared radiation, etc. In an aspect, the subject example method 600 can be implemented by one or more network components, e.g., TFL platform 410. Alternatively or additionally, a processor (e.g., processor 450) configured to confer, and that confers, at least in part, functionality to the one or more network components can enact the subject example method 600. At 610, an OV(?,R) value is determined. The determined OV(?,R) value can be based, at least in part, on a time difference between a NBSP in the TFL wireless network and a UE. In an aspect, the OV(?,R) can be determined by solving Eq. 1 where DV(?,R) and DV(?,X) can be determined based on the geographical location of the reference frame R and the instant frame X from the relevant NBSP, and where the received time difference is OV(?,X). Further, as described herein, in an aspect, where a location aware UE is available to provide data for the reference frame R, OV(?,R) can be calculated directly as equivalent to the OV(?,X) because X=R under these conditions. Further, location aware UEs that can support reception of GNSS data, such as assisted GPS (AGPS), and operation thereon (e.g., injection of GNSS data on location based applications that execute, or are native, to the mobile) or manipulation thereof, such as delivery of location data, can easily provide access to this location information. This location information can facilitate rapid geographical location of an instant frame X of the TFL wireless network, such that the DV(?,?) values can be rapidly calculated and employed in translating OV(?,X) values into OV(?,R) values. Additionally, location determinations can be accumulated, weighted, and/or otherwise statistically manipulated to provide improvements to the resulting value, for example, averaging over a plurality of OV(?,R) can be employed to reduce certain types of error propagation. In a further aspect, the location information can be accessed through network components that retain known locations, for example, location probes or wireless beacons (e.g., probes $520_1$-$520_3$). As an example, wireless beacons can be fixed location Wi-Fi outdoor access points that are part of a public metropolitan network.

At 620, the differential value DV(?,R) can be determined for the reference frame R. This can be done as part of the determination of OV(?,R) at 610, or in circumstances where a DV(?,R) is not determined as part of 610, it can be determined separately at 620, for example, where a location aware UE facilitated determining OV(?,R) directly at 610, DV(?,R) can be determined separately at 620.

At 630, a differential value DV(?,?) can be determined for frames of a bin grid framework and for NBSPs of relevance. Given that NBSP (e.g., a first and second NodeB) locations are typically well defined physical locations, the differential value, DV(?,?), can be geometrically determined (measured in chips) because the geographic location of each frame is defined by the bin grid framework in relation to each relevant NBSP. In an aspect, a NBSP can be associated with a limited set of specific frames for which the NBSP is relevant. For example, a NBSP located in San Diego, Calif. would not be relevant to bin grid frames in Redding, Calif. Thus, the relevant frames can be limited to those of significant value to any specific NBSP. As a non-limiting example, each NBSP can be limited to an arbitrary number of the closest frames, for example, 4096 frames. This can serve to reduce data that would otherwise be of little value.

At 640, a database of bin grid frame locations can be updated with DV(?,?) values for each relevant NBSP. These values can be an index through the tabulated data. These indexes can be employed to find relevant frame locations, for example, by using an SQL-type query on the indexed data. Where large volumes of data are developed for one or more bin grid frameworks, these datasets can be indexed for fast searching and can be stored in subsets for particular areas or NBSPs. For example, a bin grid frame location data set can include NBSP indices for a city, county, state, region, country, etc. As another non-limiting example, a data set for a first NodeB and other NodeBs that pair with the first NodeB can be stored at the first NodeB to facilitate indexed look-ups of frame locations for any NBSP involving the first NodeB. Further, for example, larger data sets having a plurality of NBSPs (e.g., city wide, regional, etc.) can, for example, include separate NBSP indices as a way of rapidly traversing data for a frame location look-up.

In an aspect, statistical analysis of the data, e.g., frame locations and DV(?,?) index values are utilized to establish a correlation between propagation values for multiple NBSPs (e.g., a differential locations) to facilitate structured data analysis that returns a match or limited set of potential matches for a UE location. These location values can be converted into propagation times because of the measurements are in chips. This can allow for correction and compensation of wireless network timing values as well as allowing for location-centric services and information aggregation. It should be appreciated that statistical metrics can also be employed to quantify a correlation among location data information, particularly in aggregated location data applications.

At act 650, a differential value, DV(?,X), for a frame X can be determined. For example, Eq. 3 can be employed to determine DV(?,X) for a given OV(?,X) where DV(?,R) and OV(?, R) have already been determined. At 660, a frame location set can be found and returned from the database based, at least in part, on DV(?,X) and the relevant NBSP as indexes. At this point method 600 can end. As a non-limiting example, for any given NBSP and index DV(?,X) value, 150 frames with matching DV(?,?) values can be returned. This indicates that the UE with the DV(?,X) value is likely located in one of the 150 frames returned. These frames typically correspond to a hyperbola between the NodeBs of the indicated NBSP. One advantage is that the index values for the frames are precomputed and complex math is not required at lookup to get the resulting set as would be required in a traditional multilateration technique. The value of the pre-computation and lookup aspect of the disclosed subject matter becomes significantly more prominent when numerous NBSPs are searched for the same DV(?,X) value. The increase in complexity for traditional multilateration techniques is factorial and quickly becomes computationally intensive. In contrast, the lookup technique remains comparatively computationally simple, even over large sets of data. As an example, a relevant set of NBSP frame locations for a given DV(?,X) value is likely to intercept another frame location set for a different relevant NBSP in a limited number of frame locations. This can rapidly result in convergence on a singular frame location of the two or more sets without the need for any complex math at the time of lookup.

It is noted that the subject example method 600 can be employed for location of UE in a TFL wireless network (e.g., 200, 300) and compensation of RF signal propagation delay in various operational wireless system such as macro coverage wireless systems; radar systems; home-based wireless systems, e.g., micro cell, pico cell, femto cell, Wi-Fi hot spot; or the like. It should be appreciated that for the various aforementioned wireless technologies, propagation of RF signal(s), microwave signal(s), infrared signal(s), or any other radiation signal(s), is implemented by a radio communication component, e.g., signaling and traffic component 434, that can reside within an access point that operates in accordance with a respective wireless technology.

Figure 7:
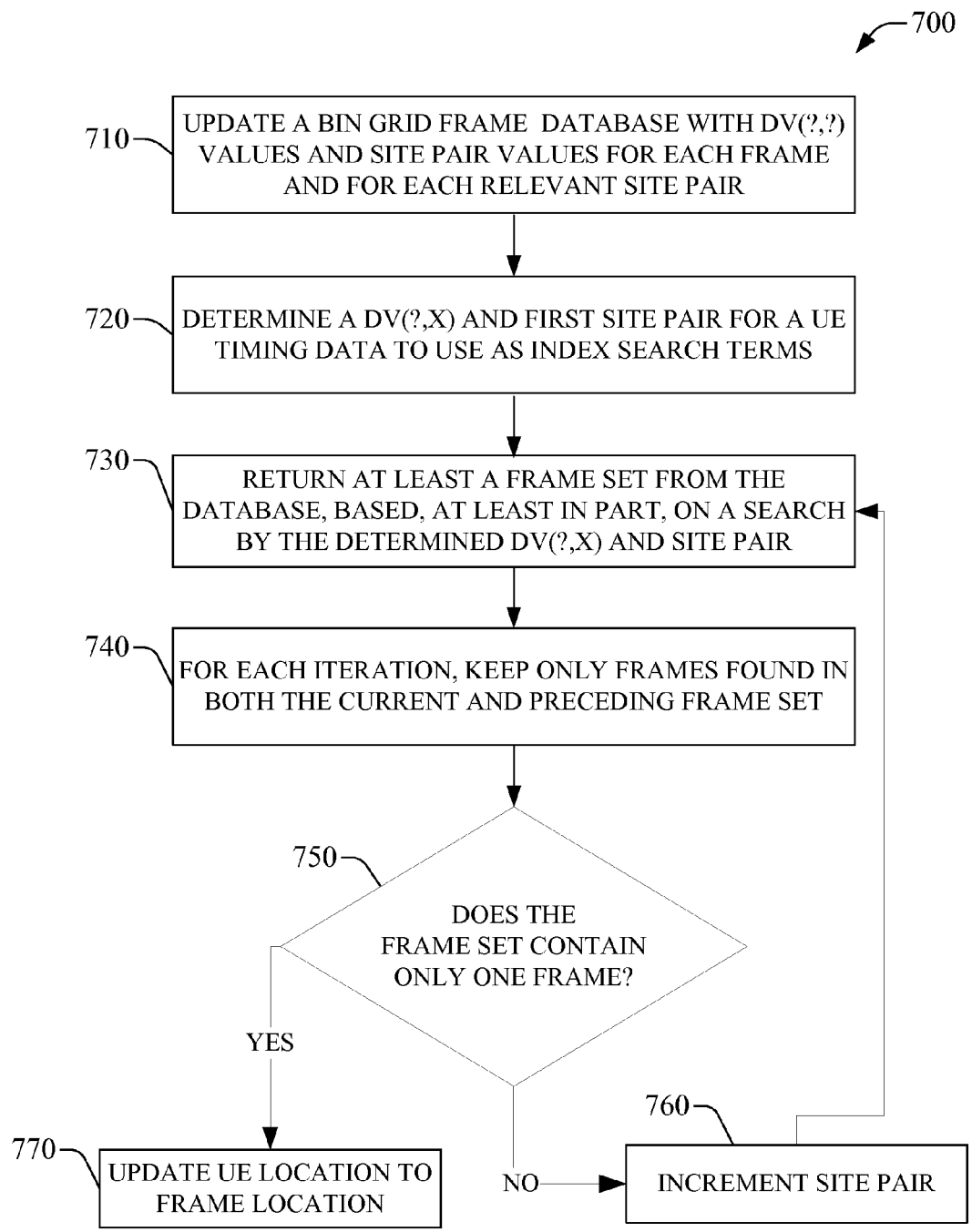
FIG. 7 is a flowchart of an exemplary method 700 for iteratively determining a location of a UE in a TFL wireless network according to aspects of the disclosed subject matter

FIG. 7 is a flowchart of an exemplary method 700 for iteratively determining a location of a UE in a TFL wireless network according to aspects of the disclosed subject matter. The subject example method 700 can be implemented by one or more network components, e.g., TFL platform 410. Alternatively or additionally, a processor (e.g., processor 450) configured to confer, and that confers, at least in part, functionality to the one or more network components can enact the subject example method 700.

At 710, a database of frame locations is updated with differential location values and NBSP identification values. Updating the DV(?,?) indices and the NBSP indices for frame location keeps the dataset well maintained over time as values can drift and NBSPs can change as sites are commissioned, decommissioned, taken down for service, or return from service, for example. Where a NodeB, for example, unexpectedly goes offline, all existing DV(?,?) values for NBSPs including the offline NodeB will be immediately invalid. Hence, updates to the database records to, for example, remove NBSPs attached to the offline NodeB will help to keep location lookups in that region relevant and accurate.

At 720, a differential location value for a UE can be determined. This can be calculated from the time data transmitted by the UE by way of Eq. 3 where the remaining values are known. Further, a first NBSP can be determined as a database index term. For example, RSCP values can indicate the closest NBSPs from which the most relevant set can be selected as a first index. Other examples of selecting relevant NBSPs can include selecting sites that have statistically reliable data associated with them, selecting pairs that are related to a general direction of travel, availability of look-up resources at various network components, etc.

At 730, a set of frame locations is returned from the database search of the selected NBSP and DV(?,X) value searched. As disclosed herein, this set can include zero, one, many, or all frame locations. As a non-limiting example, a search can return 150 frame locations in the frame location set.

At 740, for each iteration, only frames in both the current and previous set are retained. Whereas it is the first iteration, all frames in the set are kept.

At 750, a determination is made based on the number of frame locations in the frame location set. Where there is more than one frame in the frame location set, the method passes to 760. Where there is only one frame in the set, the method 700 proceeds to 770.

At 760, the NBSP is incremented and the method 700 returns to 730. Upon the return to 730, the DV(?,X) value is searched again but his time indexed with the next relevant NBSP. The method at 730 returns a new frame location set and proceeds to 740. At 740 for the second iteration, the frames of the new set and the preceding set are compared and frames found in both sets are retained in the frame set, such that upon subsequent iterations, this retained set is compared to subsequent new frame location sets and a single value will be converged on iteratively. At 750, a determination is again made relating to the number of frame locations in the frame location set. This process continues until a single frame location is present in the frame location set. One of skill in the art will appreciate that non-convergent behavior is not discusses herein, but that such behavior is within the scope of the disclosure. For example, where the behavior is non-convergent, the method can end without satisfying the decision at 750.

At 770, the sole remaining frame location is equated to the location of the UE and the UE location is updated to reflect this determination. At this point method 700 can end.

Figure 8:
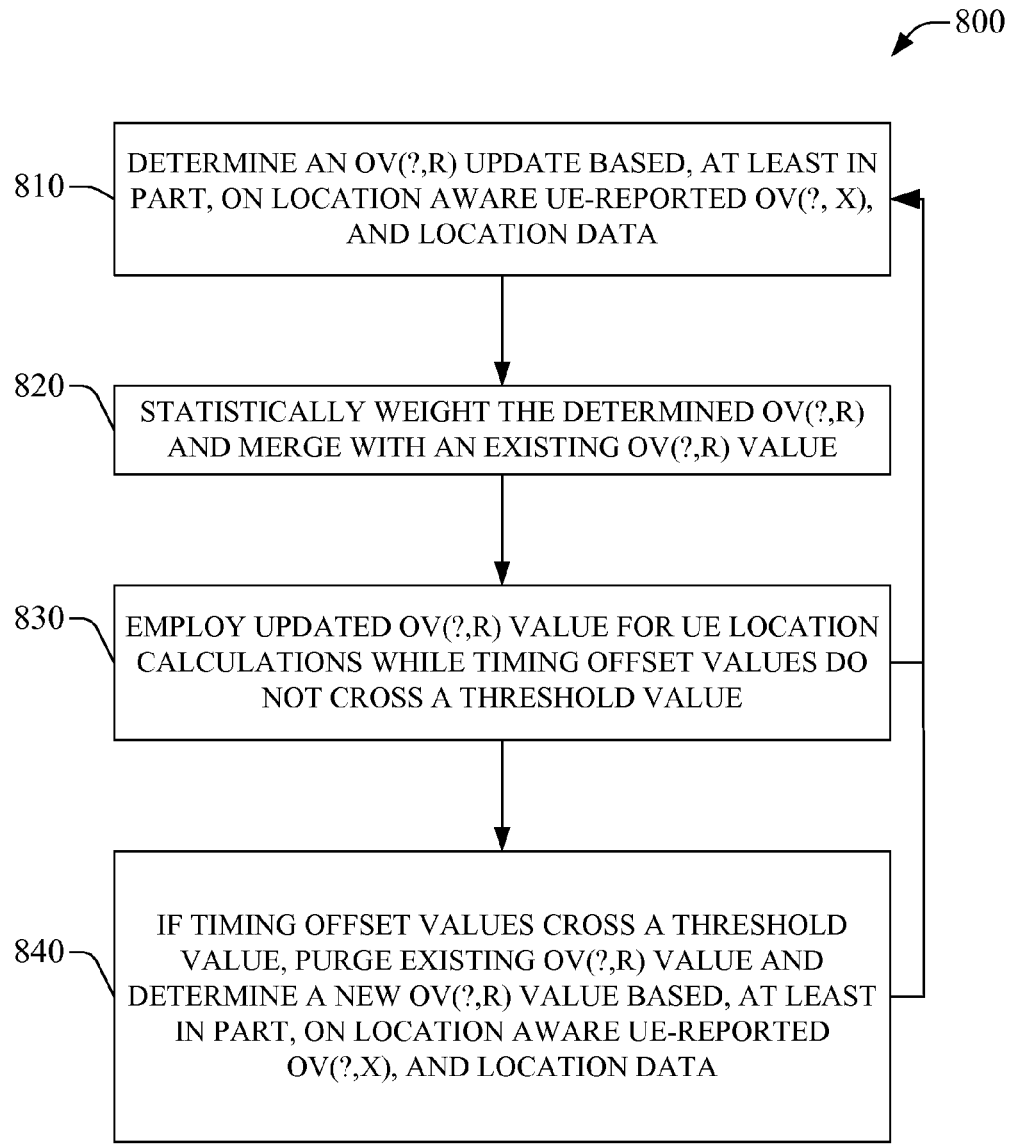
FIG. 8 presents a flowchart of an exemplary method 800 for updating site timing values according to aspects of the disclosed subject matter described herein.

FIG. 8 presents a flowchart of an example method 800 for updating site timing values according to aspects of the disclosed subject matter described herein. The subject example method 800 can be implemented by one or more network components, e.g., TFL platform 410. Alternatively or additionally, a processor (e.g., processor 450) configured to confer, and that confers, at least in part, functionality to the one or more network components can enact the subject example method 800.

At 810, an OV(?,R) update value can be determined. This can be based, at least in part, on a location aware UE providing an updated observed timing difference, e.g., OV(?,X), and location data. From this, OV(?,X) can be translated to OV(?,R), as disclosed previously herein, by Eq. 1.

At 820, the determined OV(?,R) update value can be weighted and combined with the then current value of OV(?,R). This can provide additional robustness to the reference frame observed value, which relates to site timing in the wireless network as disclosed herein. One example of this type of updating is weighted averaging, which can reduce random measurement errors. One of skill in the art will appreciate that numerous other types of statistical transformations can be applied to improve the quality of the measured value in light of subsequent measurements, all such manipulations are believed to be within the scope of the presently disclosed subject matter.

At 830, the updated OV(?,R) value is employed while not crossing a threshold value. Additional updates to the OV(?,R) can be accomplished by looping back to 810 from 830, as illustrated, even where no threshold value has been exceeded. An example of this type of OV(?,R) update value from 830 can include a location aware UE coming into a network and providing additional OV(?,X) data and location data such that an OV(?,R) update can be calculated and incorporated. At this point method 800 can end.

At 840, where a threshold value has been crossed, the existing OV(?,R) value can be purged and a new value can be applied. In an aspect this new OV(?,R) value can be based on data from location aware UE reports. In another aspect, this value can be a previously stored value from a known operational state. The purging and replacement of this value can occur, for example, where NBSP conditions have drastically changed and the existing site timing information is significantly error prone. An example of conditions that might precipitate this behavior can include equipment failure, natural disaster, construction, etc. From 840, method 800 can return to 810 and iteratively update the new value of OV(?,R) as herein described. At this point method 800 can end.

Figure 9:
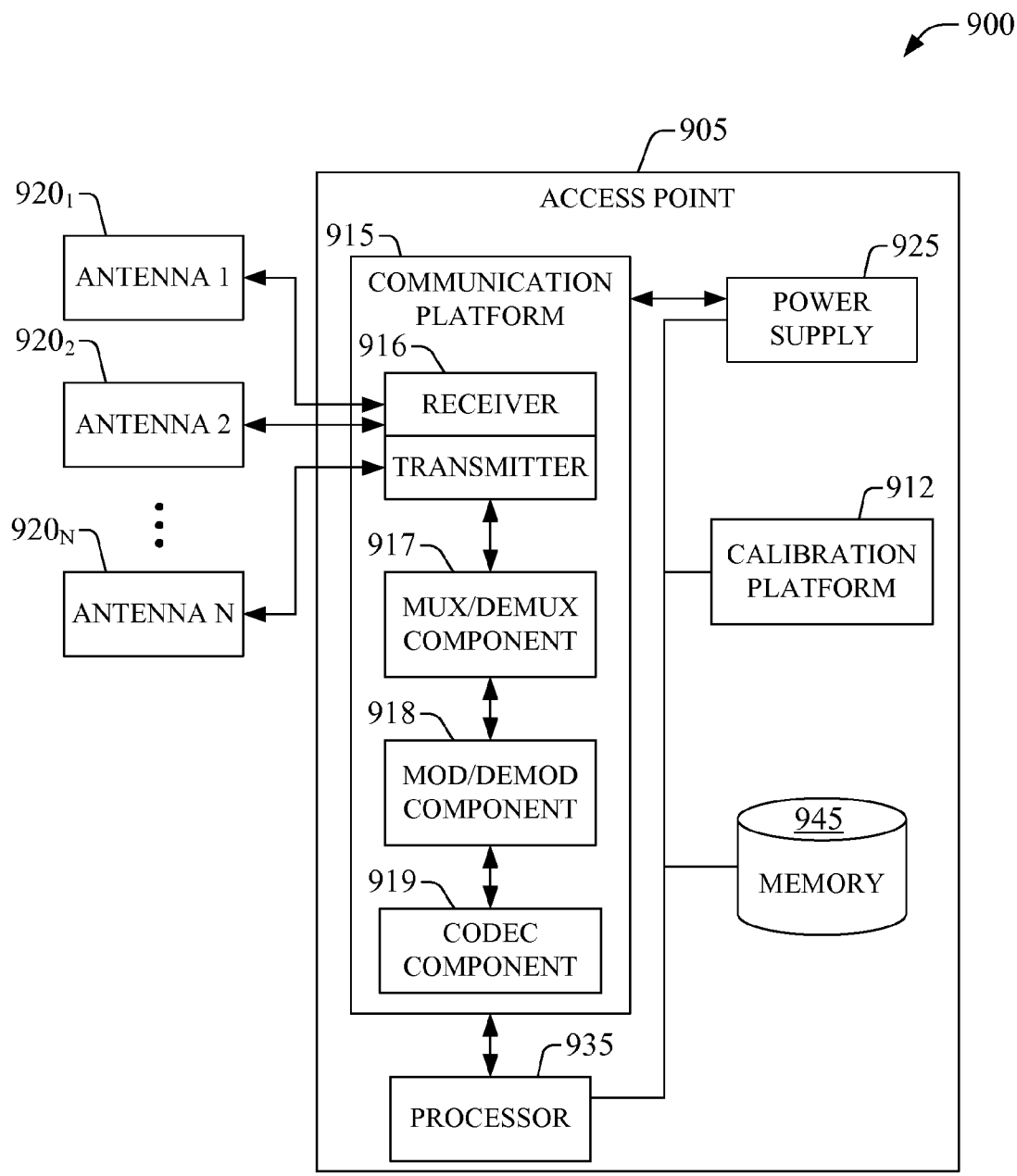
FIG. 9 illustrates a block diagram of an exemplary embodiment of an access point to implement and exploit one or more features or aspects of the disclosed subject matter.

FIG. 9 illustrates a block diagram of an example embodiment of an access point to implement and exploit one or more features or aspects of the disclosed subject matter. In embodiment 900, AP 905 can receive and transmit signal(s) (e.g., attachment signaling) from and to wireless devices like femto access points, access terminals, wireless ports and routers, or the like, through a set of antennas $920_1$-$920_N$ (N is a positive integer). It should be appreciated that antennas $920_1$-$920_N$ embody antenna(s) 432, and are a part of communication platform 915, which comprises electronic components and associated circuitry that provides for processing and manipulation of received signal(s) and signal(s) to be transmitted. Such electronic components and circuitry embody at least in part signaling and traffic component 434; communication platform 915 operates in substantially the same manner as communication platform 430 described hereinbefore. In an aspect, communication platform 915 includes a receiver/transmitter 916 that can convert signal (e.g., RL signal 438) from analog to digital upon reception, and from digital to analog upon transmission. In addition, receiver/transmitter 916 can divide a single data stream into multiple, parallel data streams, or perform the reciprocal operation. Coupled to receiver/transmitter 916 is a multiplexer/demultiplexer 917 that facilitates manipulation of signal in time and frequency space. Electronic component 917 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 917 can scramble and spread information (e.g., codes) according to substantially any code known in the art; e.g., Hadamard-Walsh codes, Baker codes, Kasami codes, polyphase codes, and so on. A modulator/demodulator 918 is also a part of communication platform 915, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 915 also includes a coder/decoder (codec) component 919 that facilitates decoding received signal(s), and coding signal(s) to convey.

Access point 905 also includes a processor 935 configured to confer functionality, at least in part, to substantially any electronic component in AP 905. In particular, processor 935 can facilitate determination of propagation delay information of RF signal, or microwave signal, among communication platform 915 and antennas $920_1$-$920_N$ in accordance with various aspects and embodiments disclosed herein. Power supply 925 can attach to a power grid and include one or more transformers to achieve power level that can operate AP 905 components and circuitry. Additionally, power supply 925 can include a rechargeable power component to ensure operation when AP 905 is disconnected from the power grid, or in instances, the power grid is not operating.

Processor 935 also is functionally connected to communication platform 915 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 935 is functionally connected, via a data or system bus, to calibration platform 912 and other components (not shown) to confer, at least in part functionality to each of such components.

In AP 905, memory 945 can store data structures, code instructions and program modules, system or device information, code sequences for scrambling, spreading and pilot transmission, location intelligence storage, determined delay offset(s), over-the-air propagation models, and so on. Processor 935 is coupled to the memory 945 in order to store and retrieve information necessary to operate and/or confer functionality to communication platform 915, calibration platform 912, and other components (not shown) of access point 905.

Figure 10:
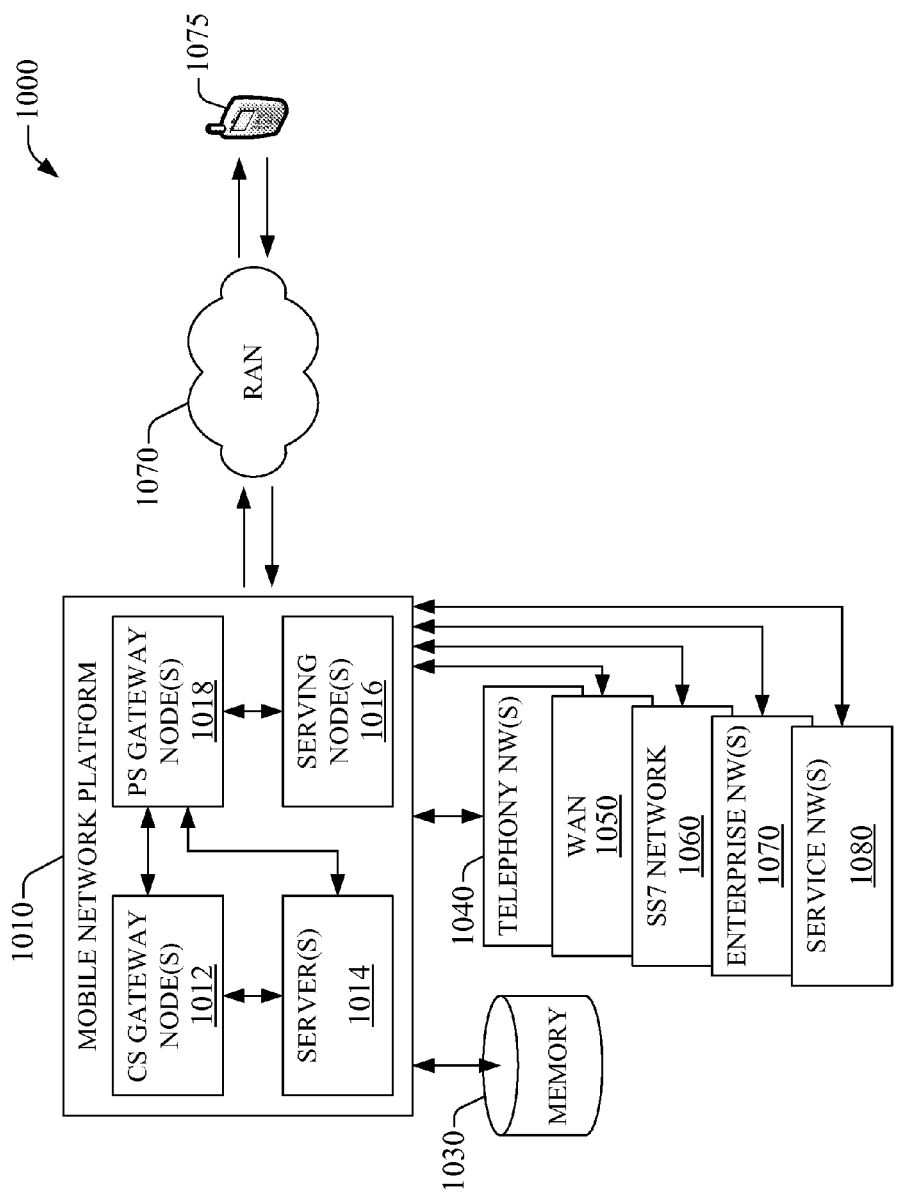
FIG. 10 is a block diagram of an exemplary embodiment of a mobile network platform to implement and exploit various features or aspects of the disclosed subject matter.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In the disclosed subject matter, in addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s)

1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications (e.g., location services, online gaming, wireless banking, wireless device management ... ) that can generate multiple disparate packetized data streams or flows, and manage (e.g., schedule, queue, format ... ) such flows. Such application(s) can include add-on features to standard services (for example, provisioning, billing, customer support ... ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto cell network(s) (not shown) that enhance wireless service coverage within indoor confined spaces and offload RAN resources in order to enhance subscriber service experience within a home or business environment. Server(s) 1014 can embody, at least in part, TFL platform 410 and any component(s) therein It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. In particular, memory 1030 can include contents of memory 440 in example system 400. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070.

It is to be noted that aspects, features, or advantages of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the disclosed subject matter as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips ... ), optical discs (e.g., compact disc (CD), digital versatile disc (DVD), blu-ray disc (BD) ... ), smart cards, and flash memory devices (e.g., card, stick, key drive ... ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the disclosed subject matter. It is, of course, not possible to describe every conceivable combination of components or methodologies for purposes of describing the disclosed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method facilitating locating a user equipment (UE) in a wireless network, the method comprising:
    determining, by a system including at least one processor, a set of geographical frame locations for a bin grid framework, the bin grid framework having a predetermined granularity;
    determining, by the system, a set of NodeB site pairs (NBSPs) comprising a first NodeB site and a second NodeB site, wherein locations of the first NodeB site and the second NodeB site are known;
    determining, by the system, a set of reference frames, wherein the set of NodeB site pairs respectively have at least one reference frame having a known location;
    accessing, by the system, a first time value (OV(1)) for a first frame of the bin grid framework correlated to a first known geographic frame location of the geographic frame locations;
    accessing, by the system, location information of the first frame for the first known geographic frame location;
    determining, by the system, a first differential value (DV(1)) for the first frame, related, at least in part, to a difference between the location information of the first frame and location information of a first NodeB site pair of the set of NodeB site pairs;
    accessing, by the system, location information for a first reference frame correlated to the first NodeB site pair;
    determining, by the system, a second differential value (DV(2)) for the first reference frame, related, at least in part, to a difference between the location information of the first reference frame and the location information of the first NodeB site pair; and
    determining, by the system, a second time value (OV(2)) based, at least in part, on OV(1), DV(1), and DV(2).

2. The method of claim 1, wherein the determining the value of OV(2) employs the formula: OV(2)=OV(1)+DV(2)−DV(1).

3. The method of claim 1, further comprising:
    determining, by the system, a frame data value set comprising computed differential values for the set of NodeB site pairs and sets of frames within a predetermined distance from NodeB site pairs, wherein the computed differential values are related, at least in part, to respective differences between respective locations of respective frames of the sets of frames and locations of a relevant NodeB site pair, wherein the relevant NodeB site pair is a NodeB site pair within the predetermined distance.

4. The method of claim 3 wherein the determining the set of values employs the formula:
    $DV(NBSP_{PQ}, X_F) = OV(NBSP_{QP}, X_F) - OV(NBSP_{QP}, X_R) + DV(NBSP_{PQ}, X_R)$ for a set of P, set of Q, and set of F, and where R is correlated to P, and wherein P, Q, F and R are index values.

5. The method of claim 3, further comprising:
    accessing, by the system, a third time value (OV(3)) for a second UE in the network;
    determining, by the system, a subset of relevant NodeB site pairs for the second UE;
    determining, by the system, a lookup value based at least in part on OV(3),
    accessing, by the system, a first subset of frames for a search through the frame data value set, the search including searching for frames correlated to the lookup value and a NodeB site pair of the subset of relevant NodeB site pairs.

6. The method of claim 5, wherein the determining the lookup value employs the formula: Lookup Value=OV(3)−OV(2)+DV(2).

7. The method of claim 5, further comprising:
    determining, by the system, a second relevant NodeB site pair of the subset of relevant NodeB site pairs for the second UE;
    accessing, by the system, a second subset of frames for a search through the frame data value set, the search including searching for frames correlated to the lookup value and the second relevant NodeB site pair; and
    indicating, by the system, intersecting frames between the first subset of frames and second subset of frames.

8. The method of claim 7 wherein the indicating the intersecting frames results in a single intersecting frame being indicated, and the geographic location of the single intersecting frame is a probable location of the UE.

9. The method of claim 7, wherein the indicating the intersecting frames, further comprises determining additional intersecting frames from additional subsets of frames including searching the frame data value set for frames correlated to the lookup value and an additional NodeB site pair of the subset of relevant NodeB site pairs including converging on a single frame being a probable location for the UE.

10. The method of 9, wherein the determining the additional intersecting frames results in intersecting frames that do not converge.

11. The method of claim 1, wherein the determining the set of geographical frame locations includes the predetermined granularity of the geographical frame locations being 100 m×100 m for each frame.

12. The method of claim 1, wherein the determining the set of geographical frame locations includes the predetermined granularity of the geographical frame locations being 1×1 chip for each frame.

13. The method of claim 1, wherein the accessing the first time value occurs at a location aware UE.

14. The method of claim 13, wherein the accessing occurs at a location aware UE that employs assisted global positioning system technology for location awareness.

15. A system to facilitate locating a user equipment (UE) in a wireless network, the system comprising:
    at least one memory that stores computer-executable instructions;

at least one processor, communicatively coupled to the at least one memory, that facilitates execution of the computer-executable instructions to at least:
communicatively couple to a plurality of NodeBs;
store a data set relating to differential frame values for at least one NodeB site pair of the plurality of NodeBs;
access timing data relating to a user equipment (UE);
compare the timing data to at least a subset of the data set relating to the at least one NodeB site pair to facilitate a determination of a location of the UE within the wireless network,
wherein at least one bin grid framework, with a predetermined level of granularity, is mapped to a geographic area of the wireless network to facilitate location of UEs within particular frames of the at least one bin grid framework based, at least in part, on UE timing data.

16. The system of claim 15, wherein the data set represents a differential distance of a target frame of the at least one bin grid framework from NodeBs of the at least one NodeB site pair calculated by:

$$DV(ij,X)=OV(ji,X)-OV(ji,R)+DV(ij,R),$$

wherein i is one NodeB of the NodeB site pair, j is the other NodeB of the NodeB site pair, X indicates the target frame, R indicates a reference frame, DV indicates a differential value and OV indicates an observed value, and the data set is indexed across NodeB site pair.

17. The system of claim 16, wherein the at least one processor further facilitates the execution of the computer-executable instructions to perform a first lookup that compares a target value with stored values of a subset of the data set, the subset being determined by an index relating to a first NodeB site pair, to facilitate access to a first set of frames that represent possible locations of the UE.

18. The system of claim 17, wherein the at least one processor further facilitates the execution of the computer-executable instructions to perform a second lookup that compares the target value with other stored values of an other subset of the data set, the other subset being determined by an index relating to a second NodeB site pair, to facilitate access to a second set of frames that represent the possible locations of the UE.

19. The system of claim 18, wherein the at least one processor further facilitates the execution of the computer-executable instructions to an intersection of the first and second set of frames to reduce a number of frames that represent the possible locations of the UE.

20. The system of claim 19, wherein a single frame results from the determined intersection, and the location of the UE is determined to be within the geographic area of the wireless network mapped by the single frame.

21. A system comprising:
an interface to a wireless network, wherein the wireless network is, at least in part, mapped to a bin grid framework;
at least one processor communicatively coupled to at least one memory that stores computer-executable instructions, the processor being operative to facilitate execution of the computer-executable instructions to at least:
access location and timing data related to at least one user equipment of the wireless network through the interface to the wireless network;
determine and store with the at least one memory, differential values related to reference frames of the bin grid framework and designated NodeB site pair for a plurality of NodeB site pairs;
determine and store the differential values related to non-reference frames of the bin grid framework and designated NodeB site pair for a plurality of NodeB site pairs;
index the stored differential values by NodeB site pair;
search the stored differential values to return information relating to the bin grid network; and
determine a search value for a user equipment (UE) of a plurality of NodeB site pairs such that sets of frames of the bin grid framework can be returned, said frames having a probability of indicating a location of the UE.

* * * * *